United States Patent [19]

Garde

[11] Patent Number: 5,068,754

[45] Date of Patent: Nov. 26, 1991

[54] METHOD AND APPARATUS FOR MEASURING BIT SHIFT

[75] Inventor: Lawrence Garde, Bloomington, Minn.

[73] Assignee: Seagate Technology, Inc., Scotts Valley, Calif.

[21] Appl. No.: 440,662

[22] Filed: Nov. 22, 1989

[51] Int. Cl.$^5$ .............................................. G11B 5/09
[52] U.S. Cl. ....................................... 360/45; 360/31
[58] Field of Search ...................... 360/45, 31; 324/212

[56] References Cited

U.S. PATENT DOCUMENTS 3,686,682  8/1972  Behr et al. .
4,612,586  9/1986  Sordello et al. .
4,799,112  1/1989  Bremmer et al. ..................... 360/31

OTHER PUBLICATIONS

"Phase Margin Analysis is Critical to Disk-Drive Test", Oct. 1989; Electronic Test Magazine, pp. 30-32, 38.

Primary Examiner—Vincent P. Canney
Attorney, Agent, or Firm—Kinney & Lange

[57] ABSTRACT

A method and apparatus for measuring aggregate bit shift (peak shift) timing error in the readback signal of a magnetic storage system. The method provides an effective measure of the relative goodness of one magnetic head with respect to another magnetic head. A repetitive data pattern is written onto a magnetic disk. The magnetic head under test reads back the magnetic transitions from the disk. The signals are amplified, detected and digitized. A low cost gating system synchronizes to the recorded data pattern and outputs a pulse at the beginning and end of a selected period corresponding to two transitions in the data pattern. A time interval measuring device connected at the output of the gating system determines the average time or time variance between the beginning and end data pulses. The average time value correlates to the aggregate bit shift inherent in the magnetic read head being measured. This relatively simple system provides fast, low cost, accurate bit shift measurement.

22 Claims, 6 Drawing Sheets

METHOD AND APPARATUS FOR MEASURING BIT SHIFT

BACKGROUND OF THE INVENTION

The present invention relates to measuring aggregate bit shift timing error in the read back signal of a magnetic storage system.

In a magnetic storage system, such as a computer disk drive, digital information is magnetically stored upon the surface of a magnetic disk. The digital information is represented by selectively polarizing the magnetic field of consecutive areas across the surface of the rotating magnetic disk. When this information is read back from the storage disk, the magnetic polarization of the medium is sensed and converted into data peaks in an electrical output signal. This reading and writing operation is through a magnetic read/write head which is suspended over the surface of the rotating disk and provides a raw data signal.

The raw data signal is representative of the relative strength of the magnetic flux density present on the magnetic disk. It is highly desirable to provide the highest level of information storage density possible for a given magnetic storage system. Unfortunately, increased storage density leads to significant noise levels in the raw data signal. The raw data signal comprises a series of data "peaks" whose location is used to represent digital information. With high data storage densities, the precise location of a data peak becomes critical because adjacent data peaks are spaced so closely together. If the data peak is shifted slightly in time, incorrect information may be read back which causes a bit shift in the digital data signal. When manufacturing a disk drive system, it is critical that the manufacturer be able to measure bit shift for a given head/disk combination at the desired data storage density. This measure is used to certify the storage system by guaranteeing a maximum error rate at the specified data storage density.

In the disk drive recording industry, it is important to measure where the bits occur within their respective data window. (The data window is a time period used to locate data peaks. A data peak which occurs outside its proper data window produces a readback error.) This measurement is a quality test of the recording system. In a good recording system, all of the bits occur close to the data window center. In contrast, a poor system has bits widely spread early and late with respect to the window center.

Prior art bit shift testers are slow. This is exacerbated because the test must be performed on each disk system manufactured. Prior art bit shift testers are not satisfactory with present-day head specifications because they are very expensive and either slow or inaccurate when used to measure bit shift at the increasingly high recording densities used in modern data storage systems.

SUMMARY OF THE INVENTION

The present invention provides a fast, low cost and accurate method for statistically predicting the performance of a magnetic recording system. The present invention measures the three major causes of bit shift: noise induced shift, overwrite induced shift and pulse crowding induced shift. Once a set of test conditions have been determined by an experimental process, the test parameters are fixed and test results are obtained quickly, at low cost. The test provokes the bit shift under worst case conditions to provide a factor which correlates to the bit shift measured by prior art bit shift testers.

In the present invention, a repetitive pattern (such as a "6DB6" pattern) is written on the disk surface. The pattern is chosen as one of the more stressful data patterns the storage system will be required to store and accurately reproduce. The magnetic head reads back the magnetic transitions from the disk and provides a raw data output signal. This signal is amplified, detected and digitized. The magnetic head and pattern detector components of the storage system may be used directly as elements of the testing system.

A gating system synchronizes data patterns in the digitized output. The gating system provides a first pulse at the start of a particular bit in the data pattern and a second pulse which indicates the end of a particular bit in the data pattern. A time interval measuring device calculates the average length of time between the occurrence of the first and second pulses from the gating system. This average is taken over a number of data samples and closely correlates to the true bit shift error rate. Jitter in the location of data bits can also be measured by calculating the statistical variance in the length of time between the first and second pulses.

DETAILED DESCRIPTION OF THE PREFERRED EMBODIMENTS

1. The Peak Shift Tester

Figure 1:
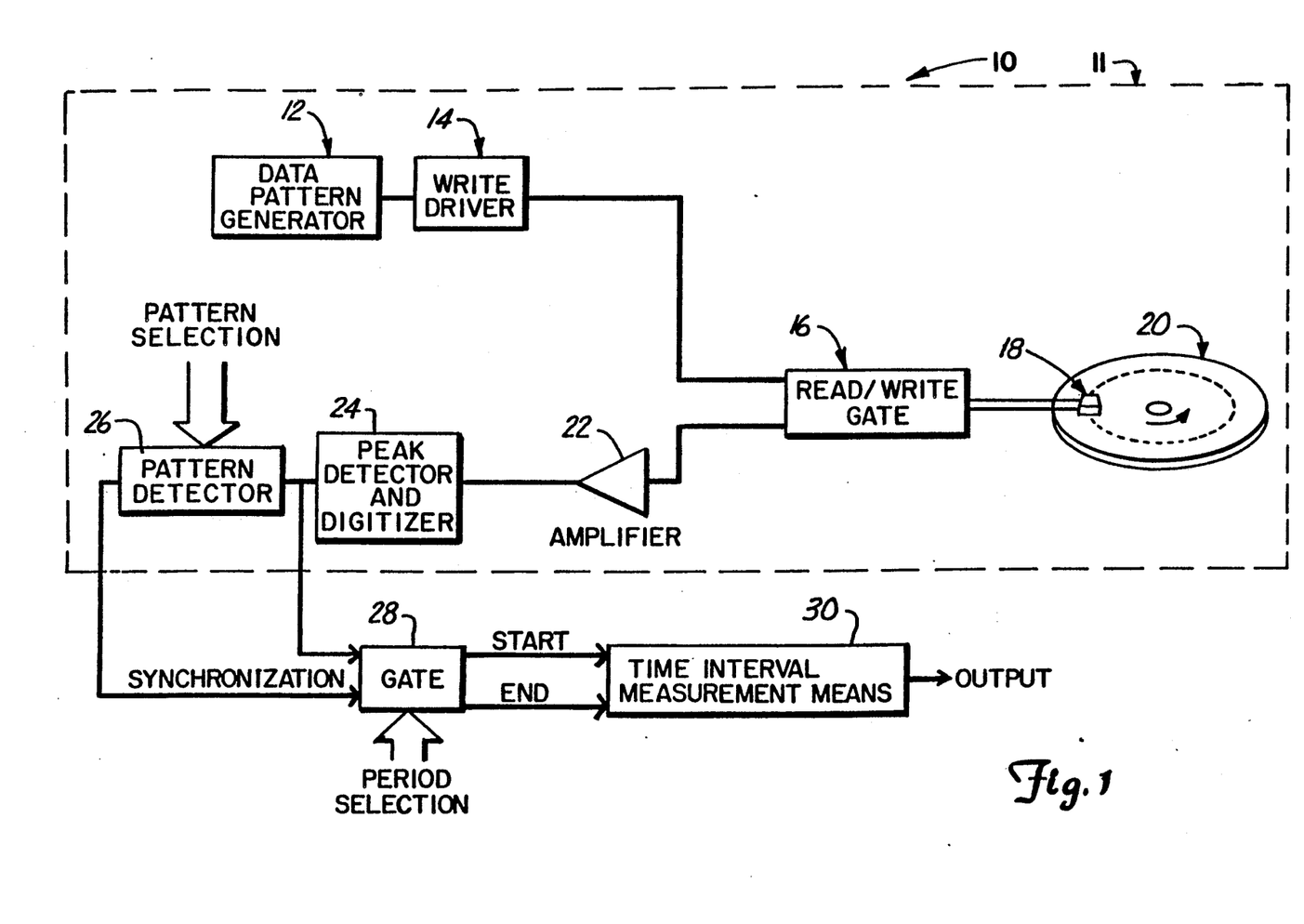
FIG. 1 shows a block diagram of the present invention.

FIG. 1 shows a block diagram of a peak shift tester 10 for a data storage system 11 in accordance with the present invention. Peak shift tester 10 includes data pattern generator 12, write driver 14, read/write gate 16 and magnetic head 18. Head 18 is suspended over magnetic disk 20 as disk 20 rotates. Data pattern generator 12 generates a 6DB6 code used in peak shift testing. Read/write gate 16 allows the same head 18 to be used for both the reading and writing process. The first step of peak shift testing is to write the 6DB6 data pattern on the area of disk 20 which is under test. The term "6DB6" refers to the hexadecimal representation of the data code.

The readback circuitry used to determine peak shift from the 6DB6 code written on disk 20 comprises amplifier 22, peak detector and digitizer 24, pattern detector 26, gate 28 and time interval measurement means 30. During the readback operation, the raw data signal produced by magnetic head 18 is routed to amplifier 20 through read/write gate 16. Peak detector and digitizer 24 converts peaks in the amplified raw data signal from magnetic head 18 into digital data pulses. Pattern generator 26 uses a pattern selection input line to select the 6DB6 code and generate synchronization pulses which comprise the data window signal. Pattern detector 26 comprises, for example, a shift register and a series of comparitors. Digital information is loaded from peak detector and digitizer 24, shifted through the shift register, and compared with the data on the PATTERN SELECTION input. Pattern detector 26 provides a pulse on a SYNCHRONIZATION line when the contents of the shift register match the selected pattern. The shift register must contain as many bits as in a data word.

Gate 28 receives inputs from pattern detector 26 and from peak detector and digitizer 24, along with a PERIOD SELECTION input. The PERIOD SELECTION input is used to select which of the data pulses from the 6DB6 readback signal will be used in the peak shift test. The PERIOD SELECTION input carries information which describes which pulse in the pattern defines the beginning of the test period and which pulse defines the end. Gate 28 preferably comprises a microprocessor or a hard wired set of flip flops including a comparator and a counter. Gate 28 counts the pulses from peak detector and digitizer 24 and outputs START and END signals when it has received the selected start and end pulses in the data pattern. The SYNCHRONIZATION input to gate 28 enables the operation of gate 28. The START output of gate 28 signals, for example, the start of the 6DB6 word. The END output from gate 28 indicates the end of the bit in the 6DB6 code selected by the period selection input to gate 28.

In the present invention, many of the components can be manufactured as integral components of storage system 11. This reduces the cost of additional equipment needed to measure bit shift.

FIGS. 2A, 2B, 2C, 2D and 2E is a timing diagram that shows the effect of peak shift on the location of data bits in the 6DB6 word. In the timing diagrams of FIGS. 2A, 2B, 2C, 2D and 2E the dashed lines indicate shifting data transitions due to peak shift in the raw data signal. Timing diagram 32 shows the 6DB6 code with no bit shift. Each bit in the 6DB6 pattern has been labelled A through K for identification. Diagram 34 shows the effect of bit shift on individual bits in the 6DB6 code. The broken lines in diagram 34 represent the shifted bits in the 6DB6 code. Diagram 34 is taken from the output of peak detector and digitizer 24 in FIG. 1. Diagram 34 illustrates that the C period (the time period of the data bit labelled "C" in the 6DB6 code shown in FIG. 2B) shows little bit shift on the leading edge and a large amount of bit shift on the trailing edge.

Figure 2A:
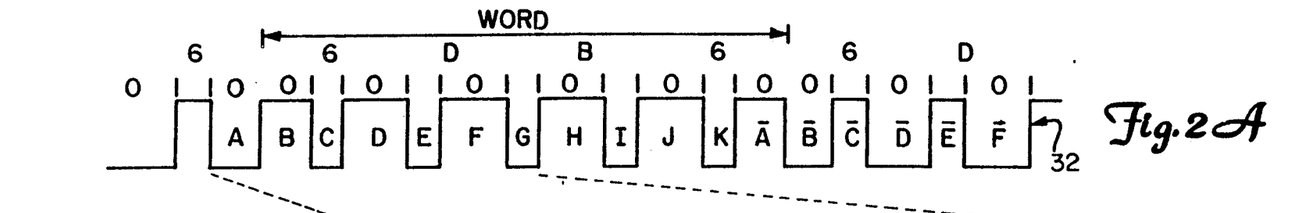
FIGS. 2A, 2B, 2C, 2D and 2E is a timing diagram for the present invention.
Figure 2B:
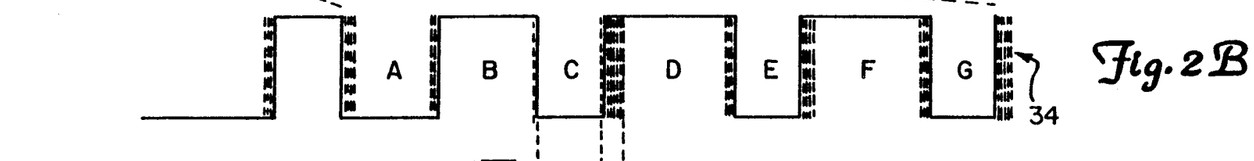
Figure 2C:
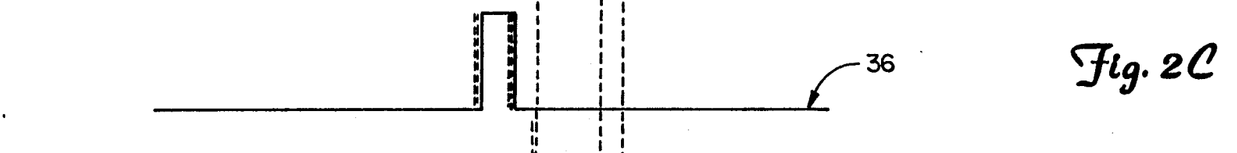
Figure 2D:
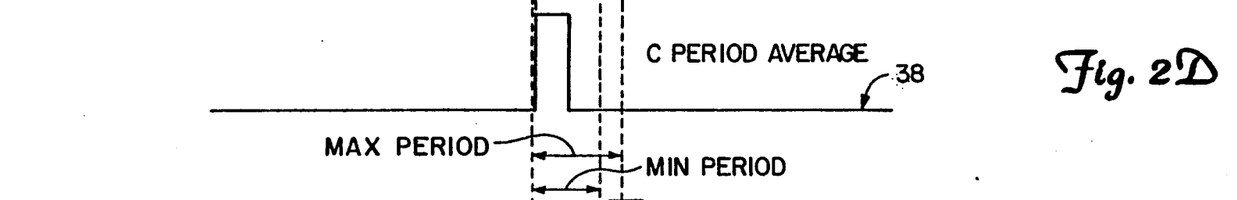
Figure 2E:
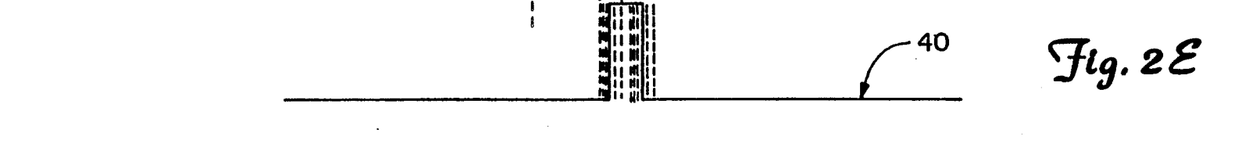

Diagram 36 in FIG. 2C shows the output of pattern detector 26 in FIG. The synchronization pulse is set to trigger on the leading edge of the bit labelled "B" in the 6DB6 word. This signal is used to enable gate 28 in FIG. 1. Gate 28 provides a start pulse shown in diagram 38 of FIG. 2D and an end pulse shown in diagram 40. When the C period is used in the test, the start pulse shows little bit shift while the end pulse shows a large amount. Time interval measurement means 30 calculates the average C period length based upon a representative number of samples. C period variance is calculated by measuring the difference between the maximum and minimum C period lengths.

All that is necessary to test the data storage system 11 for system quality with respect to bit shift was to use tester 10 to measure the average value of the C time period. The present invention reduces test time from 30 to 3 seconds. Using the present invention, the test can be conducted in only two disk rotations, one for writing the data pattern and one for reading it back.

2. Bit Shift

Figures 3A, 3B:
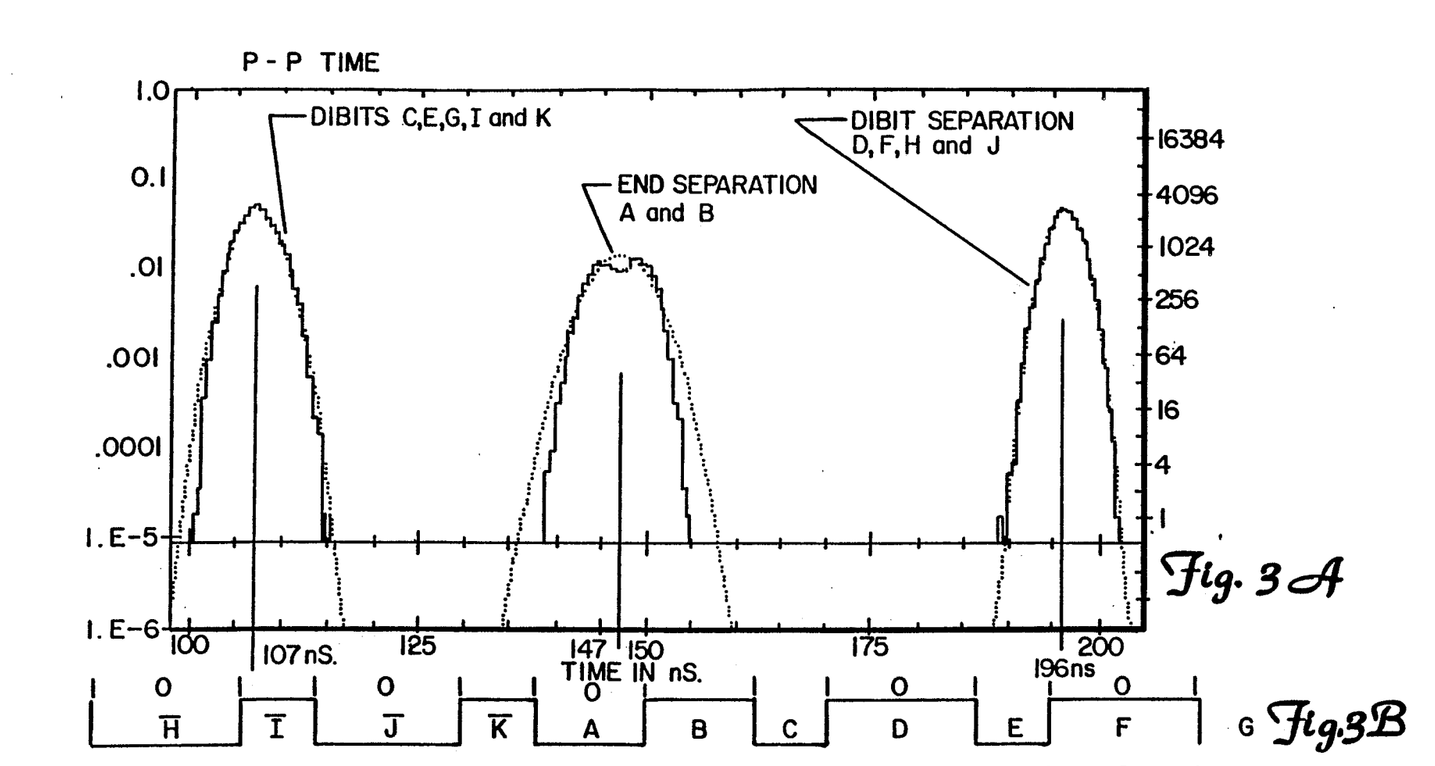
FIGS. 3A, 3B and 3C is a histogram showing the effect of various peak shift sources on the location of data peaks.
Figure 3C:
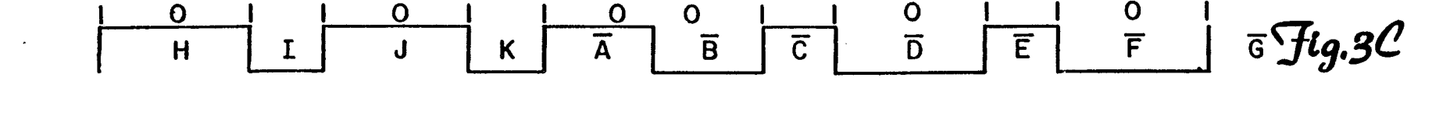

The three major causes of bit shift are: noise induced shift, overwrite induced shift, and pulse crowding induced shift. The present invention measures the cumulative effect of all three. FIGS. 3A, 3B, 3C, 4A, 4B and 4C show the effect of sources of bit shift on data peak location in a magnetic storage system. FIGS. 3A, 3B and 3C shows a histogram of the number of data peaks verses time in nanoseconds. Zero indicates the location of the data peaks when the peak shift is zero.

a. Noise Induced Bit Shift

Noise within a recording system can be separated into coherent noise and random noise. Coherent noise is usually caused by a defect in the electronics of the recording system. It can usually be corrected and will not be considered as a normal bit shift cause in this description. Random noise is usually present at some level. Component impurity and atmospheric pickup by the recording system contribute to random noise. Random noise superimposed on the readback signal of a recording system or impinging on the amplifying and peak detecting elements will introduce effective timing error to the bits, moving their position earlier or later than their actual recorded position. This noise influence is random and the distribution of its induced timing error will be equally spread early or late and have a Gaussian shape as shown in FIG. 3.

b. Overwrite Induced Bit Shift

Overwrite induced peak shift is caused when a magnetic head is writing over a magnetic medium which has been prewritten with data. Depending on whether the head is trying to change the polarity of the medium, or writing in the same polarity in which the medium was previously written, the effective energy transfer will be bucked or boosted. This varies the position where the transition is written into the medium. Thus, peak shift from the ideal position is caused as data transitions are recorded. Data written over a medium continuously prerecorded in the same polarity shifts every other new transition recorded so that a bimodal distribution of read-back pulses about the average will be observed, as shown in FIGS. 3A, 3B and 3C.

Normally, magnetic recording devices overwrite previously recorded data. Therefore, the randomness of the previously written data passing under the write head when rewriting data results in transitions randomly timeshifted in various amounts from the nominal position. Peak shifted read-back pulses are therefore spread early and late about the ideal write position, and have a normal Gaussian distribution, as shown in FIGS. 3A, 3B and 3C. Noise is always present; therefore, noise and overwrite effects are additive at the output of the peak detector.

c. Pulse Crowding Induced Bit Shift

Figure 4A:
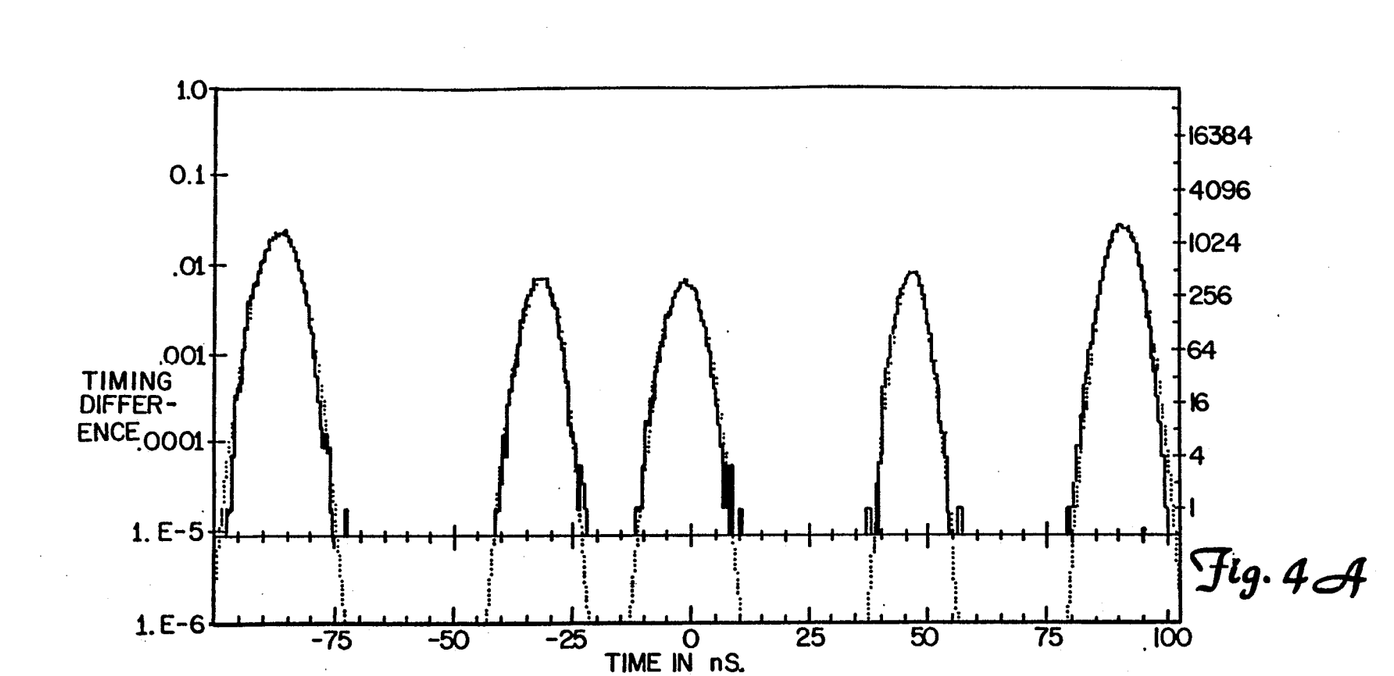
FIGS. 4A, 4B and 4C show the effect of intersymbol interference on the shape of data peaks.
Figure 4B:
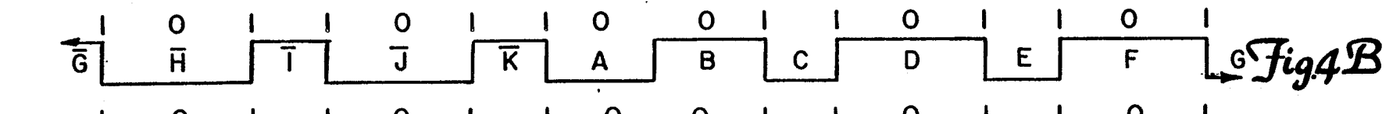
Figure 4C:
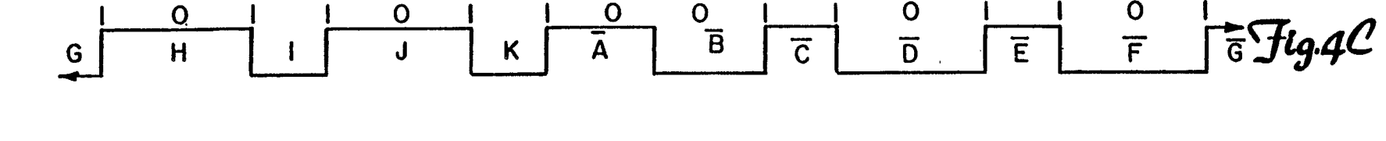

FIGS. 4A, 4B and 4C show the shape of data peaks distorted by pulse crowding. Pulse crowding distortion (i.e. intersymbol interference) occurs when closely crowded individual transitions written into the medium superimpose on each other. The signal peaks of adjacent pulses are distorted by this effect which causes the peak detector to detect earlier or later peak positions from where they were actually written in the medium. This distortion can take two forms which combine to produce bit shift at the output of the peak detector. One form is a distorted peak having a maximum differential earlier or later than the true written peak position as shown in FIGS. 4A and 4B. The other is a flattened peak effectively reducing the definition of the true peak position as shown in FIG. 4C. This allows noise to play a more effective role in causing peak shift. The additive effect of noise on the flattened peak causes timing jitter in the bits from the peak detector.

3. Data Pattern Selection

Noise and overwrite bit shift is Gaussian and is not pattern sensitive. Pulse crowding induced bit shift is very sensitive to the adjacent pulses in the readback signal. Peak distortion is dependent on the shape of the individual pulses (symbols) which are induced in the read head winding by the magnetic transition in the magnetic medium. Certain recorded transition patterns cause more peak distortion than others. For a given head/media combination, a data pattern can be found which will stress the read-back system to produce worst case test for bit shift.

Data patterns may be varied to provoke a worst case bit shift for testing any given recording system. The present invention includes a time measurement made at the output of the peak detector, while stressing the recording system with a worst case data pattern.

The purpose of the present invention is to determine time measurements which are correlatable by a single equation to those obtained by prior art bit shift testers. Once the correct test and equation is found for a given recording system, less expensive and faster testing is possible. To define the test and the equation, statistical data is taken using a standard prior art bit shift tester. The present invention is attached to the storage system and statistical data is taken of all the relevant periods in the data pattern. Conditions of maximum bit shift variance from the ideal are noted. The test is programmed thereafter to measure bit shift under those conditions. Data obtained from the prior art tester and the present invention is used to create the equation which produces correlation between the two devices. Once the test conditions and the equation have been determined, a simpler, faster test of recording quality is possible. The "6DB6" code provides a good code to stress a storage system.

FIGS. 5A, 5B, 5C and 5D shows the relationship between a digital recording signal 42, magnetic head readback signal 44 (i.e. the raw data signal), digitized readback signal 46 and data window signal 48. A bit shift induced error occurs when a logic level transition in readback signal 46 falls outside the proper window pulse period in window signal 48. Window signal 48 includes hash marks which indicate the location of level transitions readback signal 46.

Most prior art bit shift testers use the same write pattern to stress the recording system. The pattern, generally known as the "6DB6" code, is basically a modified frequency modulation code which produces a repeated eleven bit pattern. The 6DB6 pattern is shown along the top of FIGS. 5A, 5B, 5C and 5D as recording signal 42. This pattern, when written repeatedly, produces five sets of high-density "dibits" (dual "1" bits) followed by a single clock pulse ("0—0" bit). The five dibits are separated from each other by two bit spacings. In a continuing, repeating 6DB6 pattern, the clock pulse is separated from the first and the last dibit by 1.5 bit spaces.

Figures 5A, 5B, 5C:
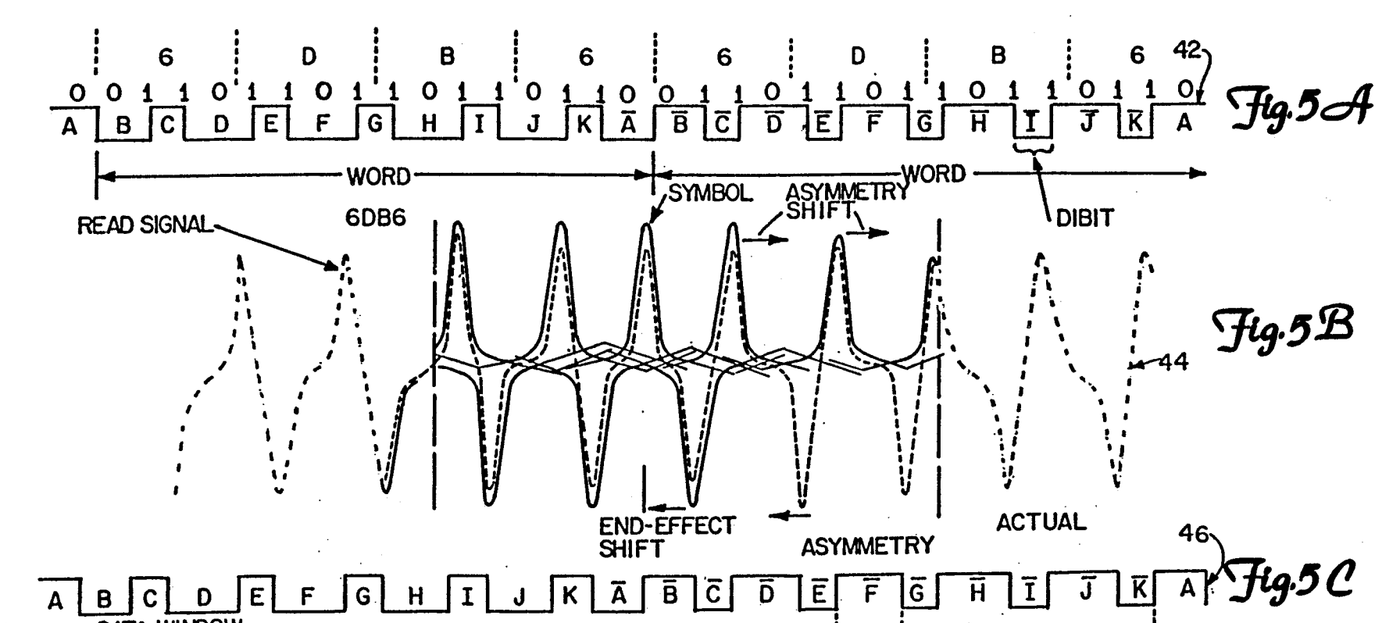
FIGS. 5A, 5B and 5C shows the timing relationship between a digital recording signal, a disk readback signal and corresponding digital output signal.
Figure 5D:
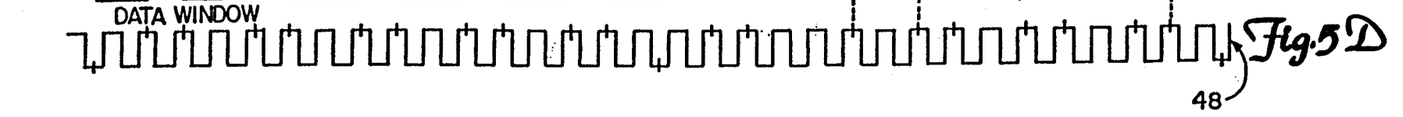

This pattern is well known in the industry for stressing the recovery system of disk drives. While it may not necessarily be considered the worst-case pattern to design around, it is predictably bad and causes considerable peak shift. Continuous dibit patterns with two-bit length separations cause alternately early and late peak shift in the recovered peaks. In FIG. 5B, the solid line in readback signal 44 shows the raw data signal from the magnetic medium without intersymbol interference effects. The dashed line labeled "Read Signal" shows how adjacent peaks interfere with one another's shape. The clock bit occurring at the end of the word separated by a 1.5 bit length can cause severe peak shift depending on the shape of pulse "symbols." This peak shift is known as "block shift" or "end effect." End effect occurs too suddenly for the read recovery Phase Locked Oscillator (PLO) in the storage system to react. It reduces read margins considerably which limits the attainable data storage density.

The pattern of dibits alternates in polarity on the disk each time the 6DB6 word is repeated. This is due to an odd number of write transitions in the 6DB6 word. Polarity switching results in asymmetrical transition recording on the magnetic disk. The degree of asymmetrical time shift varies because the head bucks (i.e. reverses) or boosts the residual magnetization left from the last write operation. Polarity switching adds to the overall peak shift magnitude and variability. The dashed waveform in read back signal 44 of FIG. 5B shows the readback signal with shifted peaks.

Figure 6:
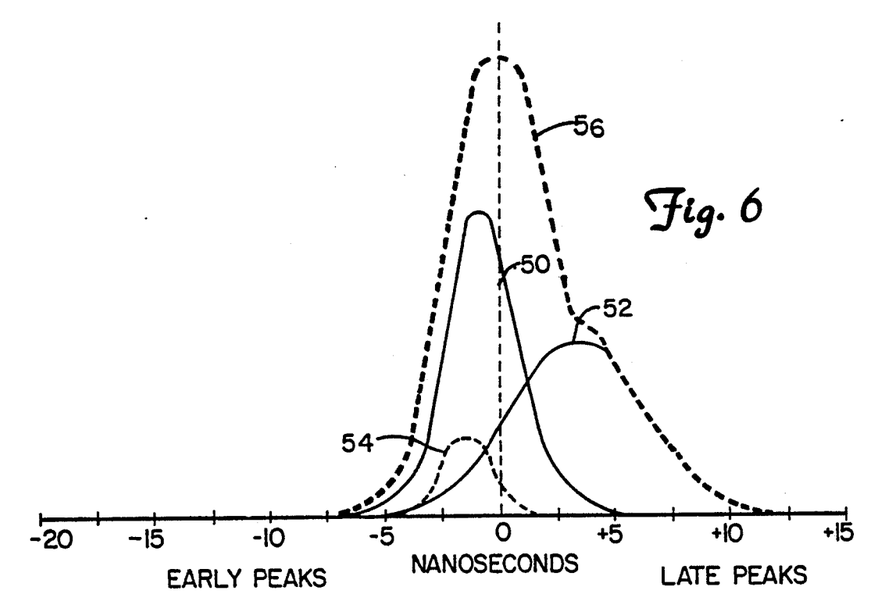
FIG. 6 is a histogram which shows the effect of peak shift on the locations of various data bits in a 6DB6 data pattern.
Figure 7:
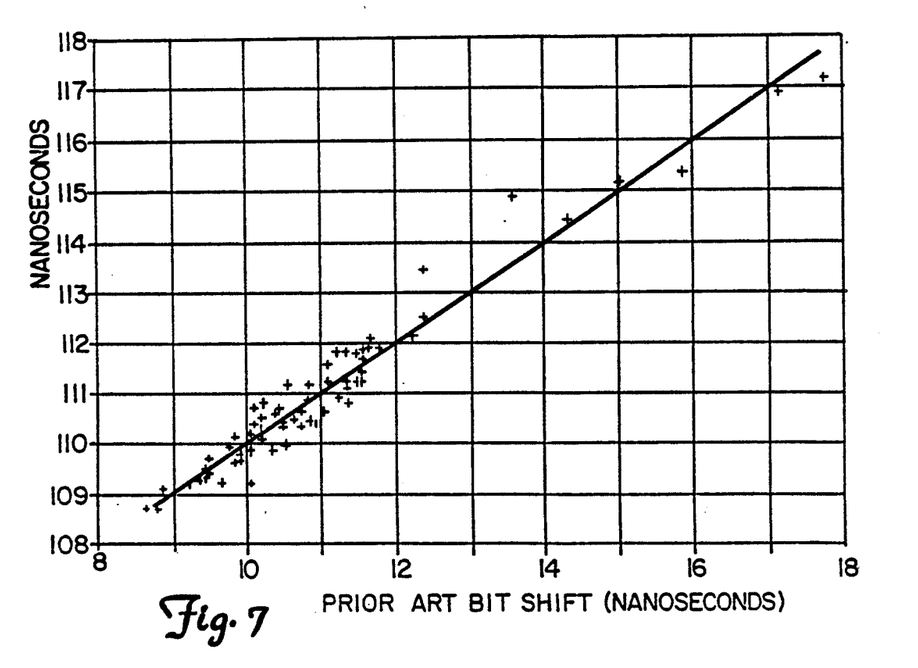
FIG. 7 is a graph showing the correlation between the data from the present invention and data from a variable window bit shift tester.

FIG. 6 shows the measured bit timing occurring after read-back of the 6DB6 data pattern. The total distribution of bits vs time is the combination of three histograms 50, 52 and 54 and is shown as histogram 56. Histogram 50 shows the distribution of transitions between bits B/C, D/E, F/G, H/I and J/K, as labelled in the 6DB6 word. Histogram 52 shows the distribution of transitions between bits C/D, E/F, G/H, I/J and K/A in the 6DB6 word. Histogram 54 shows the distribution of transitions bits A/B in the 6DB6 word. In this case with a particular head/medium combination, the pulse crowding generated more jitter and bit shift in the B/C through J/K bit transition peaks than in the C/D through K/A transition peaks. The word end (A/B) peaks were not shifted much. Also the B/C transition showed only a small variance. Therefore, the C bit period measurement was found to correlate closely to those measurements taken using a prior art bit shift tester, as shown in FIG. 7. (There was also good correlation between the time variance of the C bit period to prior art bit shift measurements.) The correlation is through the following equation:

*C Period Average = Prior Art Measured Bit Shift + 100*

This equation was derived for a particular head/disk configuration. For other configurations, the average length or variance of the chosen period can be correlated by measuring a representative sample of storage systems with both the present invention and an accepted prior art bit shift tester. This data is used to derive an equation which relates the two sets of measurements.

CONCLUSION

In the particular case chosen, using the 6DB6 pattern and the present invention, an inexpensive, realtime peak shift, measuring method is provided which correlates to projected peak shift results from prior art peak shift measuring devices. This test can also be performed at the disk drive level.

The asymmetry effect due to DC erasure, or previously written data confuses an observer of pulse-to-pulse timing. In the past, addition or subtraction of time periods is normally computed and averaged by the disk drive phase locked oscillator (PLO) loop. For this reason the ability to relate measurement of peak shift to the real-time pulse-to-pulse period has not been obvious.

PLO oriented testers are most stressed by the head with the most symbol-created peak shift. The PLO adds timing error and its contribution is out of the control of the head manufacturer. It is therefore desirable to test magnetic heads with devices that do not use a PLO reference clock. This is possible using the present invention.

In the present invention, the error rate due to bit shift is tested by measuring the period between two closely spaced transitions in a written data pattern. A circuit (gate 28 and time interval measurement means 30) is connected to the output terminal of the peak detector 24 which enables the separation, for time measurement, of the period between any two transitions of the read-back pattern. This circuit is programmed to provide a synchronizing pulse every time the data pattern repeats itself. The synchronizing pulse sets a logical gate in a condition to enable a start pulse to be produced at the leading edge of the bit, corresponding to the transition at the start of the period to be measured, and also an end pulse to be produced, corresponding to the transition at the end of the period to be measured. The time between the start and end pulse is measured using any averaging time interval measuring device of sufficient accuracy.

Timing jitter is measured using the same circuit to isolate the selected data pattern transition. Preferably the transition in the pattern having the least timing jitter is chosen for the start pulse and the transition having the most jitter is chosen for the end pulse. A time interval measurement device measures the variance of the time measurement between the start and stop pulses. In some instances, measuring the variance may provide a more accurate indication of the relative goodness of a storage system. This can be the case at particularly high levels of storage densities.

Although the present invention has been described with reference to preferred embodiments, workers skilled in the art will recognize that changes may be made in form and detail without departing from the spirit and scope of the invention.

What is claimed is:

1. An apparatus for testing peak shift in a magnetic storage system comprising:
   means for writing a data pattern on a magnetic medium;
   means for reading data from the magnetic medium and providing a read signal;
   means for detecting points of maximum differential in the read signal and providing digital pulses related to the detected points of maximum signal differential on a detector output line;
   pattern detection means connected to the output line of the means for detecting points of maximum differential in the read signal for recognizing one pattern in the digital pulses on the detector output line and producing a synchronizing pulse at a fixed interval with respect to a particular pulse in the data pattern each time the pattern is detected;
   gate means connected to the means for detecting points of maximum differential for providing a representation of a beginning and end of a period between a pair of the digital pulses on the detector output line.

2. The apparatus of claim 1 including:
   time interval measurement means connected to the gate means for determining an average time between a pair of the points of maximum differential based upon the representation of the beginning and end of a period between the pair of the digital pulses on the defector output line.

3. The apparatus of claim 1 including:
   time interval measurement means connected to the gate means for determining a time variance of the time between a pair of the points of maximum differential based upon the representation of the beginning and end of a period between the pair of the digital pulses on the detector output line.

4. The apparatus of claim 1 wherein the means for writing the data pattern on the magnetic medium is an integral component of the magnetic storage system under test.

5. The apparatus of claim 1 wherein the means for reading data from the magnetic medium is an integral component of the magnetic storage system under test.

6. The apparatus of claim 1 wherein pattern detection means is programmable to select a pattern to be recognized.

7. The apparatus of claim 6 wherein the pattern is a 6DB6 pattern.

8. The apparatus of claim 1 wherein the pattern recognized by the pattern detection means is a 6DB6 pattern.

9. The apparatus of claim 1 wherein the pattern detection means is an integral component of the magnetic storage system under test.

10. The apparatus of claim 1 wherein the gate means is programmable to select the pair of the digital pulses.

11. The apparatus of claim 1 wherein the digital representation of the beginning and end of one period between two data transitions in the pattern comprises digital logic level transitions.

12. A method for testing peak shift in a magnetic storage system comprising:
   writing a data pattern on a magnetic storage medium;
   reading the data pattern from the magnetic storage medium and providing a raw data signal;
   detecting data peaks in the raw data signal and providing on a detector output line a sequence of digital pulses related to the occurrence of a data peak;
   detecting the data pattern in the sequence of digital pulses on the detector output line and producing a synchronizing pulse at a fixed interval with respect to a particular pulse in the data pattern each time the pattern is detected; and producing a representation of a beginning and end of a period between a pair of the digital pulses on the detector output line.

13. The method of claim 12 including:
calculating the average time of the period between a pair of the data peaks in the pattern based upon the representation of the beginning and end of a period between the pair of the digital pulses.

14. The method of claim 12 including:
calculating the time variance of the period between a pair of the data peaks in the pattern based upon the representation of the beginning and end of a period between the pair of the digital pulses.

15. The method of claim 12 including:
selecting the data pattern prior to detecting the data pattern.

16. The method of claim 12 wherein the data pattern comprises a 6DB6 pattern.

17. The method of claim 12 including:
selecting the pair of the data peaks in the step of producing a representation.

18. The method of claim 12 wherein the representation comprises digital logic level transitions.

19. The method of claim 12 wherein a plurality of periods may be selected in the step of producing a representation.

20. An apparatus for testing peak shift in a magnetic storage system having a magnetic storage medium, a magnetic head, a data pattern generator, a peak detector and digitizer and a pattern detector, comprising:
gate means connected to the peak detector and digitizer for receiving digital pulses related to points of maximum differential in a raw data signal from the magnetic head and providing a representation of the beginning and end of a period between a pair of the digital pulses; and
time interval measurement means connected to the gate means for producing time interval measurements related to the beginning and end of the period between the pair of the digital pulses.

21. The apparatus of claim 20 wherein the time interval measurements comprise time average measurements.

22. The apparatus of claim 20 wherein the time interval measurements comprise time variance measurements.

* * * * *